United States Patent [19]

Touchberry et al.

[11] Patent Number: 5,579,110
[45] Date of Patent: Nov. 26, 1996

[54] IN-LINE MULTIPLE ROTATION SENSOR ASSEMBLY

[75] Inventors: Alan B. Touchberry, St. Louis; Thomas J. Rolfer, Blaine, both of Minn.

[73] Assignee: Honeywell Inc., Minneapolis, Minn.

[21] Appl. No.: 298,623

[22] Filed: Aug. 31, 1994

[51] Int. Cl.$^6$ ................................................. G01C 19/70
[52] U.S. Cl. ................................................. 356/350
[58] Field of Search ..................................... 356/350

[56] References Cited

U.S. PATENT DOCUMENTS

| | | | |
|---|---|---|---|
| 3,373,650 | 3/1968 | Killpatrick | 356/350 |
| 3,563,662 | 2/1971 | Wing | 356/350 |
| 4,594,790 | 6/1986 | Engebretson | 356/350 X |
| 5,173,745 | 12/1992 | Hanse | 356/350 |
| 5,329,355 | 7/1994 | Killpatrick | 356/350 |

OTHER PUBLICATIONS

R. J. Wright, Jr., et al., "A Ring Laser Gyro Based Navigator for Space Launch Vehicle Guidance," 1988, from IEEE Plans '88 Position Location and Navagation Symposium Record–Navigation into the 21st Century, Orlando, Florida, Nov. 29–Dec. 2, 1988, pp. 271–279.

Garret et al "A Strapdown Laser Gyro Navigator" NAECON 74 Record, pp. 572–583, 1974.

*Primary Examiner*—Vincent P. McGraw
*Attorney, Agent, or Firm*—John G. Shudy, Jr.

[57] ABSTRACT

An elongated inertial measurement unit having a plurality of gyros, none of which is aligned with the cardinal longitudinal axis of the elongated housing. At least one gyro has its input sensing axis aligned at an angle between 35 and 55 degrees, preferably at 45 degrees, relative to the cardinal longitudinal axis. This results in effective dithering by each of the enclosed gyros. All of the gyros are situated such that the centers of their masses or configurations are aligned with or approximately located in a row along the longitudinal axis of the elongated housing. The housing may be of various cross-sectional shapes, but the preferred shape of such housing is a right circular cylinder.

16 Claims, 5 Drawing Sheets

IN-LINE MULTIPLE ROTATION SENSOR ASSEMBLY

BACKGROUND OF THE INVENTION

The present invention refers to gyros and particularly to ring laser gyros. More particularly, the invention pertains to multiple gyro inertial measurement units which typically have three gyros, one in each coordinate direction. Such units also typically contain an accelerometer in each coordinate direction. Further, the invention pertains to gyro sensor orientation in an elongated, tubular or cylindrical inertial measurement unit.

Ring laser gyros function with counter propagating light waves in a ring cavity. The cavity has mirrors with quasi-total reflectivity and one output mirror with a small transmissivity. The two counter propagating beams are admitted through the output mirror. At rest, the emitted frequencies (or wavelengths) are equal, since the cavity length is the same in both directions. When it is rotated there is a small difference of light path lengths in the cavity because of the Sagnac effect, which yields a frequency difference between both counter propagating beams, as shown by the following formula:

$$\Delta f_R = 4 \cdot A / \lambda B \cdot \Omega;$$

where A is the area enclosed by the ring cavity, B is the perimeter, and $\lambda$ is the wavelength of the light when the gyro is at rest. The frequency difference is measured by combining the two output beams to get an interference. Since the beams have different frequencies, their phase difference varies as $$\Delta \Phi = 2\tau \Delta F_R \cdot T.$$

The interference and intensity is modulated at the beat frequency $\Delta F_R$ which is $$I = I_1 1[1 + \text{cosine}(2\tau) \Delta F_R T].$$

The counting of the beats gives the rate of rotation, since a $\Delta F_R$ is proportional to the rotation rate $\Omega$. The angle value corresponding to one modulation period is called the angular increment $\Theta_{INC}$, with $\Theta_{INC} \cdot \Delta F_R = \Omega$ or $\Theta_{INC} = \lambda B/4A$.

Many high performance ring laser gyros have a triangular cavity with a perimeter of 20–30 centimeters. They typically function at a wavelength of 633 nanometers with an He-Ne amplifying media. $\Theta_{INC}$ is approximately equal $10^{-5}$ radian which is approximately equal to 2 arc seconds. A rotation of one degree per hour (i.e., 1 arc second/second) gives a beat frequency of 0.5 hertz.

The effect can be understood by considering an ideal circular cavity. Both counter propagating beams create a standing wave with a space of $\lambda/2$ between nodes. When the gyro is rotating, the standing wave remains at rest in inertial space, but the detector rotates and gives one count each time it is passing at a length of $\lambda/2$. Thus, the angular increment, $\Theta_{INC}$, is simply $\Theta_{INC} = \lambda/2R$, where R is the radius of the cavity (which is consistent with the general formula $\Theta_{INC} = \lambda B/4A$, since in this case $B = 2\tau R$ and $A = \tau R^2$).

The main problem of the ring laser gyro is the phenomenon of mode locking between the counter propagating beams. As a matter of fact, these are oscillators with a very high resonance frequency (in the range of $5 \times 10^{14}$ hertz) and a very small frequency-difference. There is some weak coupling between both oscillators. They get locked together and oscillate at the same frequency, creating a dead zone at low rotation rate. The main source of coupling is the back scattering of the mirrors. To solve this problem, the quality of the reflective coating on mirrors was drastically improved. However, even with very low scattering mirrors, there is still a dead zone (typically several degrees per hour) which is much wider than the potential sensitivity of the device. This lock-in is solved with a mechanical dither to vibrate the gyro in an oscillatory rotation about the rotation sensing axis at a rate outside of the dead zone. Present dithered laser gyros have excellent performances (i.e., bias stability better than $10^{-2}$ degree/hour and a scale factor accuracy better than one part per million over a dynamic range of +/−400 degrees/second).

Thus, one has ring laser gyros with the dithering mechanism which must be secured to a mount so there is significant inertial resistance to shift the gyro back and forth effectively. Many stand-alone packages, especially elongated housings, for gyros do not provide a sufficient mounting to effectively dither the ring laser gyro to attain the needed accuracy of the gyro.

The ring laser gyroscope and its aspects of dithering are elaborated in U.S. Pat. No. 3,373,650, entitled "Laser Angular Rate Sensor," by J. Killpatrick and issued Apr. 2, 1965, which is incorporated herein by reference; and U.S. Pat. No. 5,329,355, entitled "Dither Stripper to Leave Base Motion," by J. Killpatrick and issued Jul. 12, 1994, which is incorporated herein by reference.

SUMMARY OF THE INVENTION

The present invention provides a sensor orientation for elongated packaging of a multitude of gyroscopes, particularly, dithered ring laser rotation sensors, plus accelerometers, functioning as an inertial measurement unit. Conventional mounting of gyros have cardinal coordinates of the housing structure parallel with and/or perpendicular to the input axes of the gyros. In the present invention, none of the gyros has a rotation sensing axis aligned with the cardinal longitudinal coordinate in the direction of the greater dimension of the elongated package. This non-alignment ensures an effective dithering of all the laser gyros in such package. Also, the gyros are situated in line along the cardinal longitudinal axis to provide better rotational inertial properties and less coning, and which has particular applicability in compactness for navigability in underground drilling or surveying.

DESCRIPTION OF THE PREFERRED EMBODIMENT

Figure 1:
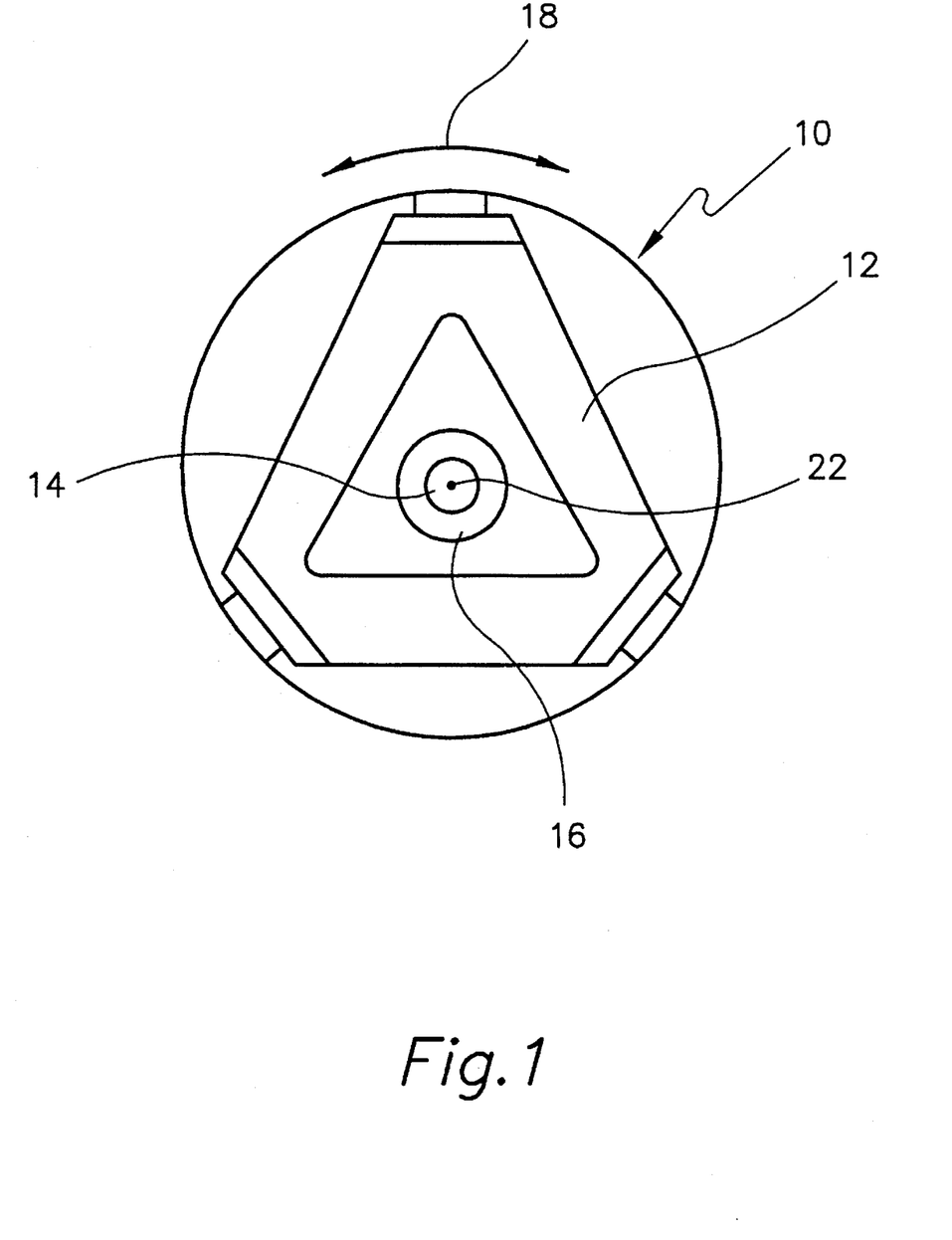
FIG. 1 reveals a typical ring laser gyroscope.

A ring laser gyro 10, as illustrated in FIG. 1, has a ring-like laser cavity 12 having a mount 14 at the center. As explained above, cavity 12 is dithered with respect to mount 14 by dither mechanism 16 in an at least a partially rotating, alternately clockwise and counterclockwise, motion 18 for eliminating lock-in of the laser angular motion sensor 10. Dither motor or oscillation means 16 is capable of producing a first torque acting on angular motion sensor ring 12 with respect to base 14, resulting in a second torque on ring cavity 12 acting in the direction opposite of the first torque, causing both ring cavity 12 and base 14 to rotationally oscillate relative to each other, there being a rotational moment of inertia at base 14, depending on the mass inertia of the object that base 14 is attached to. If base 14 is not attached to anything or to a very light mass then there is a dither mass reaction problem in that ring 12 is not effectively dithered relative to the inertial space, that is, there is a dither reaction mass problem which results in significant angular motion detection error by ring laser gyro 10, because base 14 absorbs much of the dithering motion 18. At the center of base 14, perpendicular to a plane that the laser cavity lies in, which is the same of the plane of the paper of FIG. 1, is an input axis 22 about which rotation is sensed by gyro 10.

Figure 2:
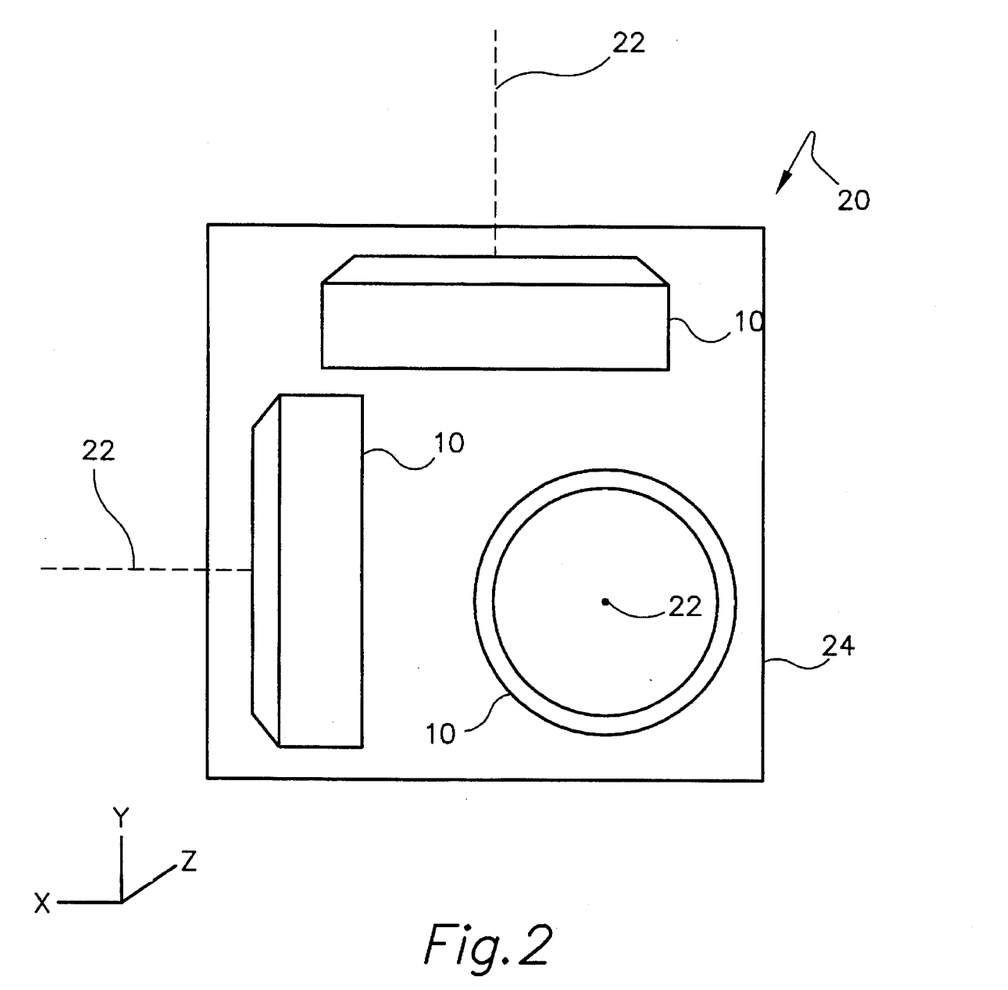
FIG. 2 shows a conventional three-axis inertial measurement unit.

FIG. 2 shows a multi-gyro inertial measurement unit 20 having ring laser gyros 10 used to measure angular motion in three coordinates of unit 20. In unit 20, input sensing axes 22 are aligned with cardinal coordinates x, y and z of housing 24. Gyros 10 have bases attached to housing 24 and which along with mass of the other two gyros 10 may provide a sufficient inertial mass reaction to provide effective dithering of cavity 12 of respective gyro 10.

Figure 3:
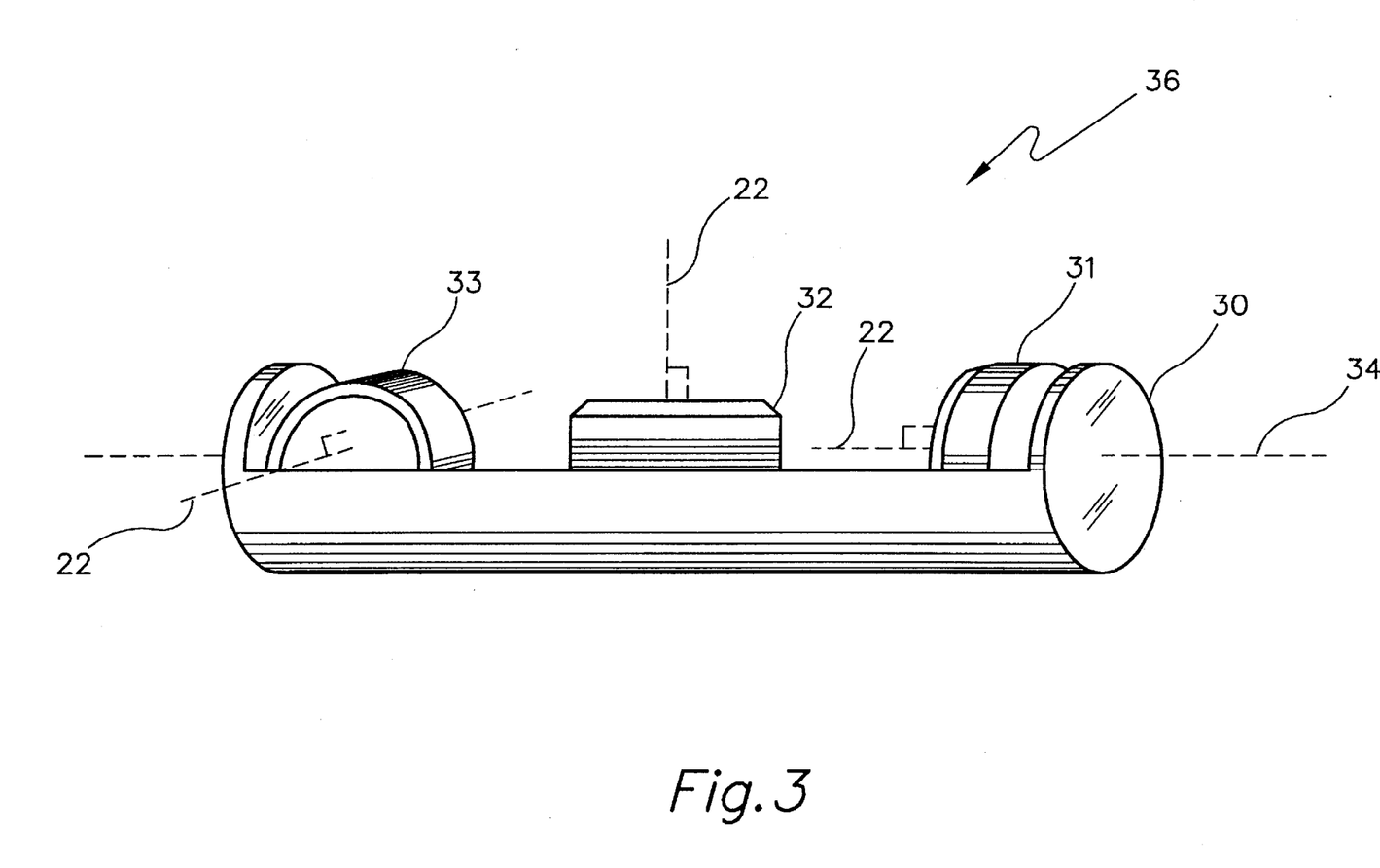
FIG. 3 illustrates a tubular housing with gyros and their positions relative to the housing.

FIG. 3 shows another configuration of gyros 31, 32 and 33 in cylindrical housing 30 of inertial measurement unit 36. Elongated housing 30 may have various kinds of cross-section shapes such as an ellipse, square, triangle, or other shape. The essential feature of housing 30 is that it is elongated with respect to the other dimensions of housing 30 and has a longitudinal axis 34 on which the centers of masses of gyros 31, 32 and 33 are approximately aligned. Such alignment is different from the arrangement of the gyros 10 in inertial measurement unit 20 of FIG. 2.

Inertial measurement unit 36 may be used in a boring, drilling or surveying device wherein the size and/or shape for an inertial navigation unit is limited to the hole that is being drilled or surveyed. Such inertial measurement unit 36 provides information back to the driller as to the location of the inertial measurement unit and associated drilling bit or tool, or observation device in a hole somewhere under ground. One problem with inertial measurement unit 36, is that gyro 31 has a less effective dithering mechanism 16, as shown in FIG. 1, then gyros 32 and 33. That is because the base of gyro 31 is mounted to the end of cylinder housing 30 which has little rotational inertia. The input axis 22 of gyro 31 is aligned with cardinal longitudinal coordinate 34 of housing 30. The ineffective dithering of cavity 12 of gyro 31 is due to insufficient inertial mass resistance provided to base 14 of gyro 31 thereby resulting in excessive rotation sensing errors by gyro 31 and inertial measurement unit 36. The dithering problem is not prevalent with respect to gyros 32 and 33 because bases 14 of those gyros along axis 22 see a greater rotational moment of inertia than is seen by base 14 of gyro 31.

Gyros 31, 32 and 33 are each a model GG1320 ring laser gyro by Honeywell Inc. of Minneapolis, Minn. Gyros 31, 32 and 33 are each about 3.5 inches in diameter and cylindrical housing 44 is about 4 inches in diameter. Total mass of housing 44, including associated electronics and accelerometers 48, is about 25.5 pounds. The rotational inertia for base 14 of gyro 31 of inertial measurement unit 36 is about 58.4 lb.-in$^2$. The rotational moment of inertia for the base of gyro 32 is about 1640.6 lb.-in$^2$ and for gyro 33 it is about 1635.2 lb.-in$^2$.

Figure 4:
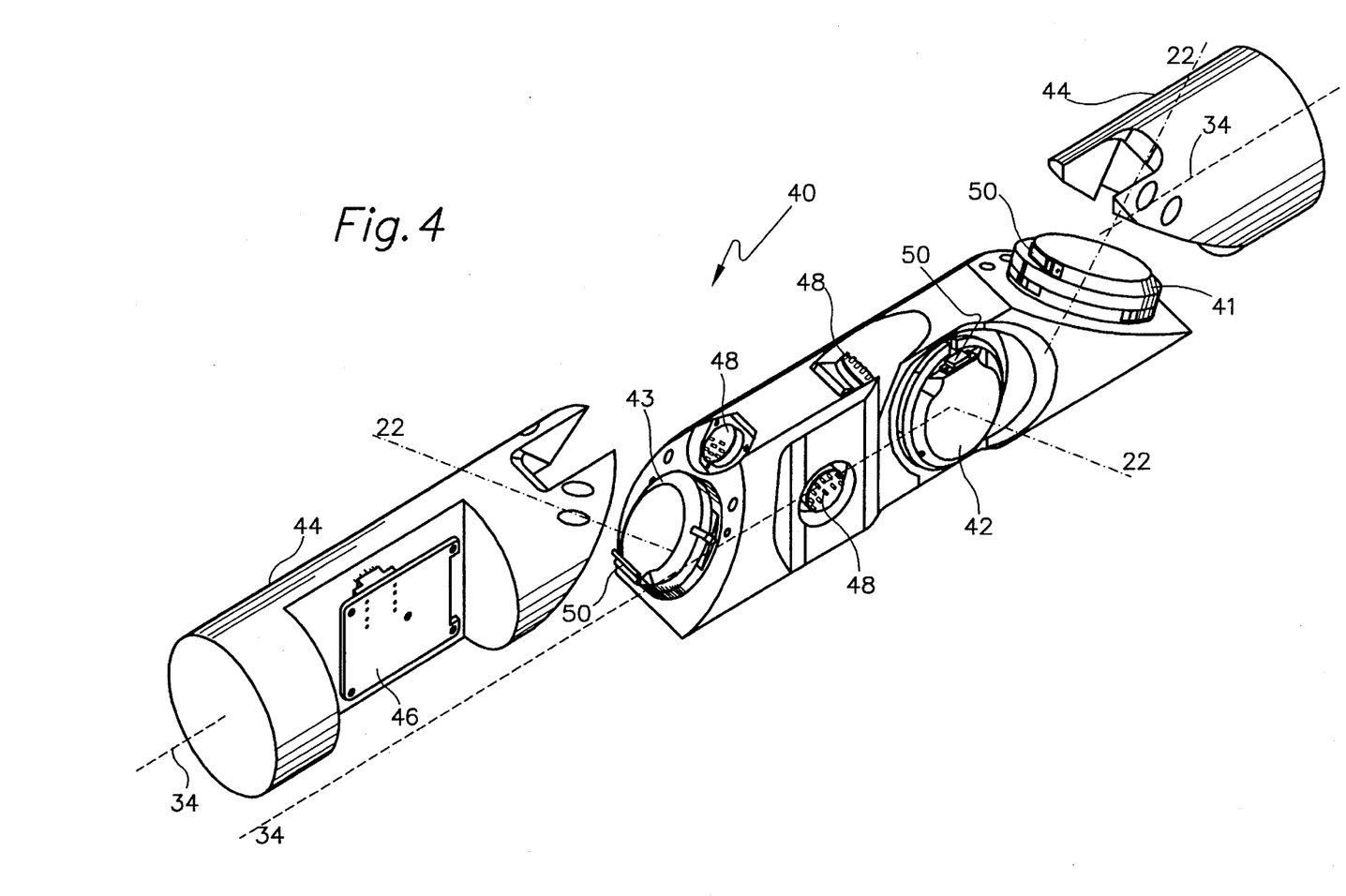
FIG. 4 illustrates an elongated housing containing a three-axis inertial measurement unit having ring laser gyroscopes situated with a special orientation so as to improve dither and reduce coning, for greater overall accuracy of the unit.

The above- and below-indicated calculations of moments of inertia were made with a solid modeling program, entitled PRO/ENGINEER, from Parametric Technology Corporation in Waltham, Mass. The program was used in a UNIX-based SUN SPARC 2 computer. Housing 44 may be treated as a solid aluminum cylinder, because the gyros, accelerometers and electronics, including space, result in a similar density and geometry of such cylinder, for purposes of doing pencil-and-paper calculations of the moments of inertia, using well-know mathematical techniques, in lieu of the modeling program.

FIG. 4 reveals a new gyro orientation in an inertial measurement unit 40 to avoid the dithering problem of one of the gyros, such as gyro 31 of unit 36 in FIG. 3, due to very low rotational moment of inertia at base 14. Gyros 41, 42 and 43 are model GG1320 ring laser gyros made by Honeywell. Gyro 41 of FIG. 4, which corresponds to gyro 31, has its input axis 22 situated at an angle of about 45 degrees relative to the cardinal longitudinal axis 34 of housing 44. Gyro 42 continues to have its input axis 22 orthogonal to longitudinal axis 34. Also, axes 22 of gyros 41 and 42 are orthogonal to each other. Input axis 22 of gyro 43 is orthogonal to both axes 22 of gyros 41 and 42. Input axis 22 of gyro 43 also has an inclination of approximately 45 degrees relative to the longitudinal axis 34 of housing 44. Included as part of inertial measurement unit 40 are accelerometers 48, and electronics 46 for processing signals from accelerometers 48 and signals from gyros 41, 42 and 43, indicating possible rotation about input axes 22. This configuration of inertial measurement unit 40 results in greater measurement accuracy of gyro 41 over the corresponding same model of gyro 31 in inertial measurement unit 36. The rotational moment of inertia for base 14 of gyro 41 is better by a factor of 12.9 of the rotational moment of inertia for base 14 of gyro 31. The rotational inertial moments of gyros 41, 42 and 43 are 755.5 lb.-in$^2$, 1467.4 lb.-in$^2$ and 762.8 lb.-in$^2$, respectively.

Figure 5:
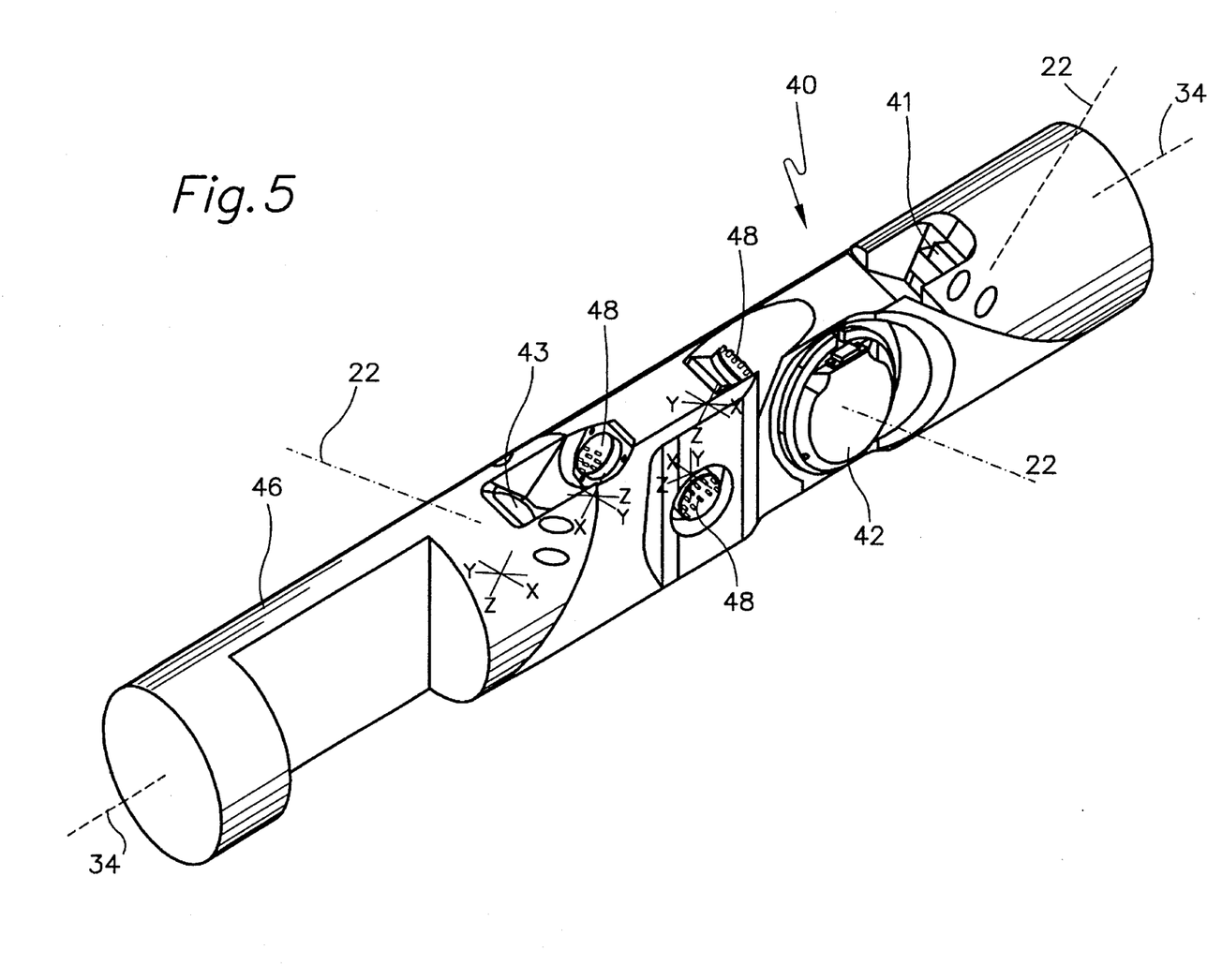
FIG. 5 is another illustration of the elongated housing containing specially-oriented gyros.

FIG. 5 reveals a more complete fabrication of inertial measurement unit 40, with several cut-aways, like that of FIG. 4, for illustrative purposes. In this figure cable connectors 50 are shown having location orientations for ease of cabling that reduces interference with limited space or a hole that inertial measurement unit 40 is used to navigate in.

We claim:

1. An inertial measurement unit comprising:

an elongated housing having dimensions of a cross-section having a center, and of a length, and having a longitudinal axis approximately parallel to the dimension of length and intersecting the center of the cross-section;

a first rotation sensor, having a center of mass approximately aligned on the longitudinal axis, for sensing rotation about an input axis, having a closed-path laser cavity, and a dithering device having a base and being attached to the laser cavity, the dithering device being for at least partially rotating, alternately clockwise and counterclockwise, the laser cavity about the input axis and relative to the base, the base being attached to said housing with the input axis at an angle between 35 and 55 degrees relative to the longitudinal axis;

a second rotation sensor, having a center of mass approximately aligned on the longitudinal axis, for sensing rotation about an input axis, having a closed-path laser cavity, and a dithering device having a base and being attached to the laser cavity, the dithering device being for at least partially rotating, alternately clockwise and counterclockwise, the laser cavity about the input axis and relative to the base, the base being attached to said housing with the input axis approximately orthogonal to the longitudinal axis and to the input axis of said first rotation sensor; and a third rotation sensor, having a center of mass approximately aligned on the longitudinal axis, for sensing rotation about an input axis, having a closed-path laser cavity, and a dithering device having a base and being attached to the laser cavity, the dithering device being for at least partially rotating, alternately clockwise and counterclockwise, the laser cavity about the input axis and relative to the base, the base being attached to said housing with the input axis approximately orthogonal to the input axes of said first and second rotation sensors; and wherein said first, second and third rotation sensors are situated, respectively, in line along the longitudinal axis to improve inertial properties and to reduce coning of said inertial measurement unit.

2. A cylindrical-shaped inertial measurement unit comprising:

a housing having a cardinal longitudinal axis perpendicular to a plane such that if the plane intersected said cylinder, an approximately circular cross-section of said housing would result in the plane and the cardinal longitudinal axis would intersect a center of the approximately circular cross-section;

a first angular motion sensor, having a center of mass approximately aligned on the cardinal longitudinal axis, for sensing rotational motion about a primary axis with respect to a base mounted in said housing and with the primary axis having an angle between 35 and 55 degrees relative to the cardinal longitudinal axis of said housing, comprising an oscillation means capable of producing a torque acting on said first angular motion sensor with respect to the base causing both said first angular motion sensor and the base to rotationally oscillate relative to each other, there being a rotational moment of inertia at the base of said first angular motion sensor, greater than a rotational moment of inertia at the base of said first angular motion sensor if said first angular motion sensor were mounted with the primary axis at an angle between 0 and 30 degrees relative to the cardinal longitudinal axis of said housing;

a second angular motion sensor, having a center of mass approximately aligned on the cardinal longitudinal axis, for sensing rotational motion about a primary axis with respect to a base mounted in said housing with the primary axis having an angle approximately orthogonal to the primary axis of said first angular motion sensor, said second angular motion sensor comprising an oscillation means capable of producing a torque acting on said second angular motion sensor with respect to the base of said second angular motion sensor causing both said second angular motion sensor and the base of said second angular motion sensor, to rotationally oscillate relative to each other; and a third angular motion sensor, having a center of mass approximately aligned on the cardinal longitudinal axis, for sensing rotational motion about a primary axis with respect to a base mounted in said housing with the primary axis having an angle approximately orthogonal to the primary axis of said first and second angular motion sensors, said third angular motion sensor comprising an oscillation means capable of producing a torque acting on said third angular motion sensor with respect to the base of said third angular motion sensor causing both said third angular motion sensor and the base of said third angular motion sensor, to rotationally oscillate relative to each other; and wherein said first, second and third rotation sensors are situated in line along the cardinal longitudinal axis to improve inertial properties and to reduce coning of said cylindrical-shaped inertial measurement unit.

3. The inertial measurement unit of said claim 2 wherein said first, second and third angular motion sensors are situated within said housing.

4. The inertial measurement unit of claim 2 wherein said housing has a diameter-like dimension less than 1.5 times of a greatest diameter of either first, second and third angular motion sensor.

5. The inertial measurement unit of claim 2 further comprising at least one accelerometer.

6. The inertial measurement unit of claim 2 further comprising an electronics module connected to said first, second and third angular motion sensors and mounted to said housing, for processing signals indicating amounts of rotational motion, from said first, second and third angular motion sensors.

7. An inertial measurement unit comprising:

a housing having a plurality of dimensions of size and a longitudinal axis in the direction of the largest dimension of size;

a first angular motion sensor, having a center of mass approximately aligned on the longitudinal axis, for sensing rotational motion about a primary axis with respect to a base mounted in said housing with the primary axis having an angle between 35 and 55 degrees relative to the cardinal longitudinal axis of said housing, comprising an oscillation means capable of producing a torque acting on said first angular motion sensor with respect to the base causing both said first angular motion sensor and the base to rotationally oscillate relative to each other, there being a rotational moment of inertia at the base of said first angular motion sensor, greater than a rotational moment of inertia at the base of said first angular motion sensor if said first angular motion sensor were mounted with the primary axis at an angle between 0 and 30 degrees relative to the cardinal longitudinal axis of said housing;

a second angular motion sensor, having a center of mass approximately aligned on the longitudinal axis, for sensing rotational motion about a primary axis with respect to a base mounted in said housing with the primary axis having an angle approximately orthogonal to the primary axis of said first angular motion sensor, said second angular motion sensor comprising an oscillation means capable of producing a torque acting on said second angular motion sensor with respect to the base of said second angular motion sensor causing both said second angular motion sensor and the base of said second angular motion sensor, to rotationally oscillate relative to each other; and a third angular motion sensor, having a center of mass approximately aligned on the longitudinal axis, for sensing rotational motion about a primary axis with respect to a base mounted in said housing with the primary axis having an angle approximately orthogonal to the primary axis of said first and second angular motion sensors, said third angular motion sensor comprising an oscillation means capable of producing a torque acting on said third angular motion sensor with respect to the base of said third angular motion sensor causing both said third angular motion sensor and the base of said third angular motion sensor, to rotationally oscillate relative to each other; and wherein said first, second and third rotation sensors are situated in line along the longitudinal axis to improve inertial properties and to reduce coning of said inertial measurement unit.

8. The inertial measurement unit of claim 7 wherein said first, second and third angular motion sensors are positioned in a row along the longitudinal axis of said housing.

9. The inertial measurement unit of claim 8 wherein said first, second and third angular motion sensors are contained within said housing.

10. The inertial measurement unit of claim 9 further comprising processing means, contained within said housing and connected to said first, second, and third angular motion sensors, for receiving signals from said first second and third angular motion sensors and processing the signals into rotation and orientation information of said inertial measurement unit.

11. The inertial measurement unit of claim 10 further comprising at least one accelerometer, contained within said housing, connected to said processing means.

12. A cylindrical-shaped inertial measurement unit comprising:

a housing having a cardinal longitudinal axis perpendicular to a plane such that if the plane intersected said cylinder, an approximately circular cross-section of said housing would result in the plane and the cardinal longitudinal axis would intersect a center of the approximately circular cross-section;

a first angular motion sensor, having a center of mass approximately aligned on the cardinal longitudinal axis, for sensing rotational motion about a primary axis with respect to a base mounted in said housing and with the primary axis having an angle approximately 45 degrees relative to the cardinal longitudinal axis of said housing, comprising an oscillation means capable of producing a torque acting on said first angular motion sensor with respect to the base causing both said first angular motion sensor and the base to rotationally oscillate relative to each other, there being a rotational moment of inertia at the base of said first angular motion sensor, significantly greater than a rotational moment of inertia at the base of said first angular motion sensor if said first angular motion sensor were mounted with the primary axis at an angle between 0 and 30 degrees relative to the cardinal longitudinal axis of said housing;

a second angular motion sensor, having a center of mass approximately aligned on the cardinal longitudinal axis, for sensing rotational motion about a primary axis with respect to a base mounted in said housing with the primary axis having an angle approximately orthogonal to the cardinal longitudinal axis and to the primary axis of said first angular motion sensor, said second angular motion sensor comprising an oscillation means capable of producing a torque acting on said second angular motion sensor with respect to the base of said second angular motion sensor causing both said second angular motion sensor and the base of said second angular motion sensor, to rotationally oscillate relative to each other; and a third angular motion sensor, having a center of mass approximately aligned on the cardinal longitudinal axis, for sensing rotational motion about a primary axis with respect to a base mounted in said housing with the primary axis having an angle approximately orthogonal to the primary axis of said first and second angular motion sensors, said third angular motion sensor comprising an oscillation means capable of producing a torque acting on said third angular motion sensor with respect to the base of said third angular motion sensor causing both said third angular motion sensor and the base of said third angular motion sensor, to rotationally oscillate relative to each other; and wherein said first, second and third rotation sensors are situated, respectively, in line along the cardinal longitudinal axis to improve inertial properties and to reduce coning of said cylindrical-shaped inertial measurement unit.

13. An inertial measurement unit comprising:

an elongated structure having a longitudinal axis along a centerline of the tubular structure;

a first gyroscope having a center of mass approximately aligned on the longitudinal axis and having an input axis at an angle of approximately 45 degrees relative to and intersecting the longitudinal axis;

a second gyroscope having a center of mass approximately aligned on the longitudinal axis and having an input axis approximately perpendicular to the input axis of said first gyroscope, and approximately perpendicular to and intersecting the longitudinal axis; and a third gyroscope having a center of mass approximately aligned on the longitudinal axis and having an input axis approximately perpendicular to the input axes of said first and second gyroscopes and intersecting the longitudinal axis; and wherein said first, second and third gyroscopes are situated in line along the longitudinal axis to improve inertial properties and to reduce coning of said elongated structure.

14. An inertial measurement unit comprising:

a tubular structure having a longitudinal axis along a centerline of the tubular structure;

a first gyroscope having a center of mass approximately aligned on the longitudinal axis, and having an input axis at an angle between 35 and 55 degrees relative to and intersecting the longitudinal axis;

a second gyroscope having a center of mass approximately aligned on the longitudinal axis, and having an input axis approximately perpendicular to the input axis of said first gyroscope and intersecting the longitudinal axis; and a third gyroscope having a center of mass approximately aligned on the longitudinal axis, and having an input axis approximately perpendicular to the input axes of said first and second gyroscopes, and intersecting the longitudinal axis; and wherein said first, second and third gyroscopes are situated in line along the longitudinal axis to improve inertial properties and to reduce coning of said tubular structure.

15. A cylindrical inertial measurement unit comprising:

a cylinder having a cardinal axis perpendicular to a circular cross section of said cylinder;

a first gyroscope, mounted in said cylinder, having a center of mass approximately aligned on the cardinal axis, and having an input axis at an angle between 35 and 55 degrees relative to the cardinal axis;

a second gyroscope, mounted in said cylinder, having a center of mass approximately aligned on the cardinal axis, and having an input axis approximately orthogonal to the input axis of said first gyroscope; and a third gyroscope, mounted in said cylinder, having a center of mass approximately aligned on the cardinal axis, and having an input axis approximately orthogonal to the input axes of said first and second gyroscopes; and wherein said first, second and third gyroscopes are situated in line along the cardinal axis to improve inertial properties and to reduce coning of said cylindrical inertial measurement unit.

16. A inertial measurement unit comprising:

an elongated housing having a cardinal axis perpendicular to a cross section of said cylinder and intersecting a center of the cross section;

a plurality of gyroscopes mounted in said housing and having a centers of mass approximately aligned on the cardinal axis;

at least one gyroscope of said plurality of gyroscopes, having an input axis at an angle between 35 and 55 degrees relative to the cardinal axis;

at least one gyroscope of said plurality of gyroscopes, having an input axis approximately orthogonal to the input axis of said at least one gyroscope having the input axis at the angle between 35 and 55 degrees relative to the cardinal axis; and at least one gyroscope of said plurality of gyroscopes, having an input axis approximately orthogonal to the input axis of said at least one gyroscope having the input axis at the angle between 35 and 55 degrees relative to the cardinal axis, and to the input axis of said at least one gyroscope having the input axis approximately orthogonal to the input axis of said at least one gyroscope having the input axis between 35 and 55 degrees relative to the cardinal axis; and wherein said plurality of gyroscopes are situated in line along the cardinal axis to improve inertial properties and to reduce coning of said inertial measurement unit.

* * * * *